Patented Sept. 17, 1946

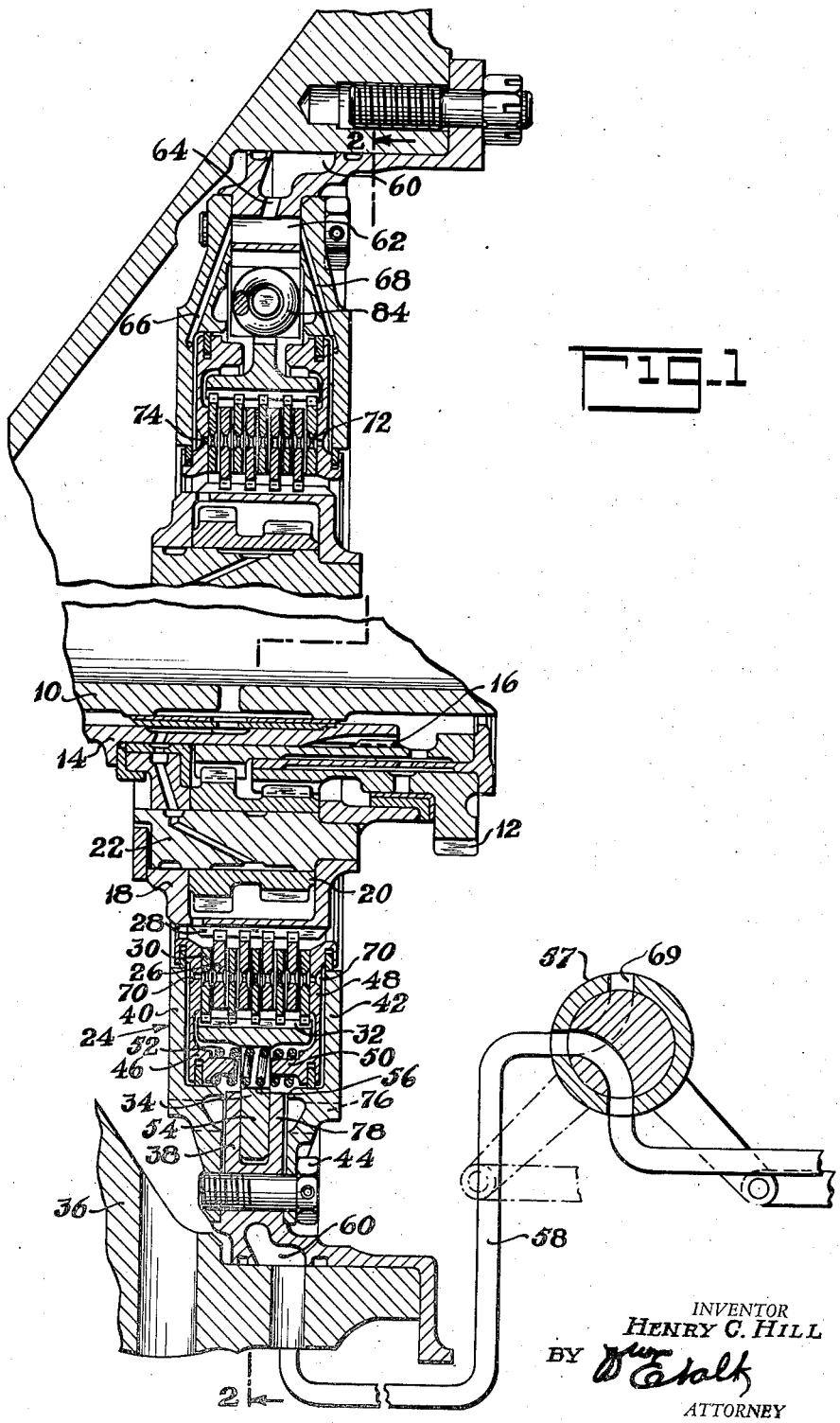

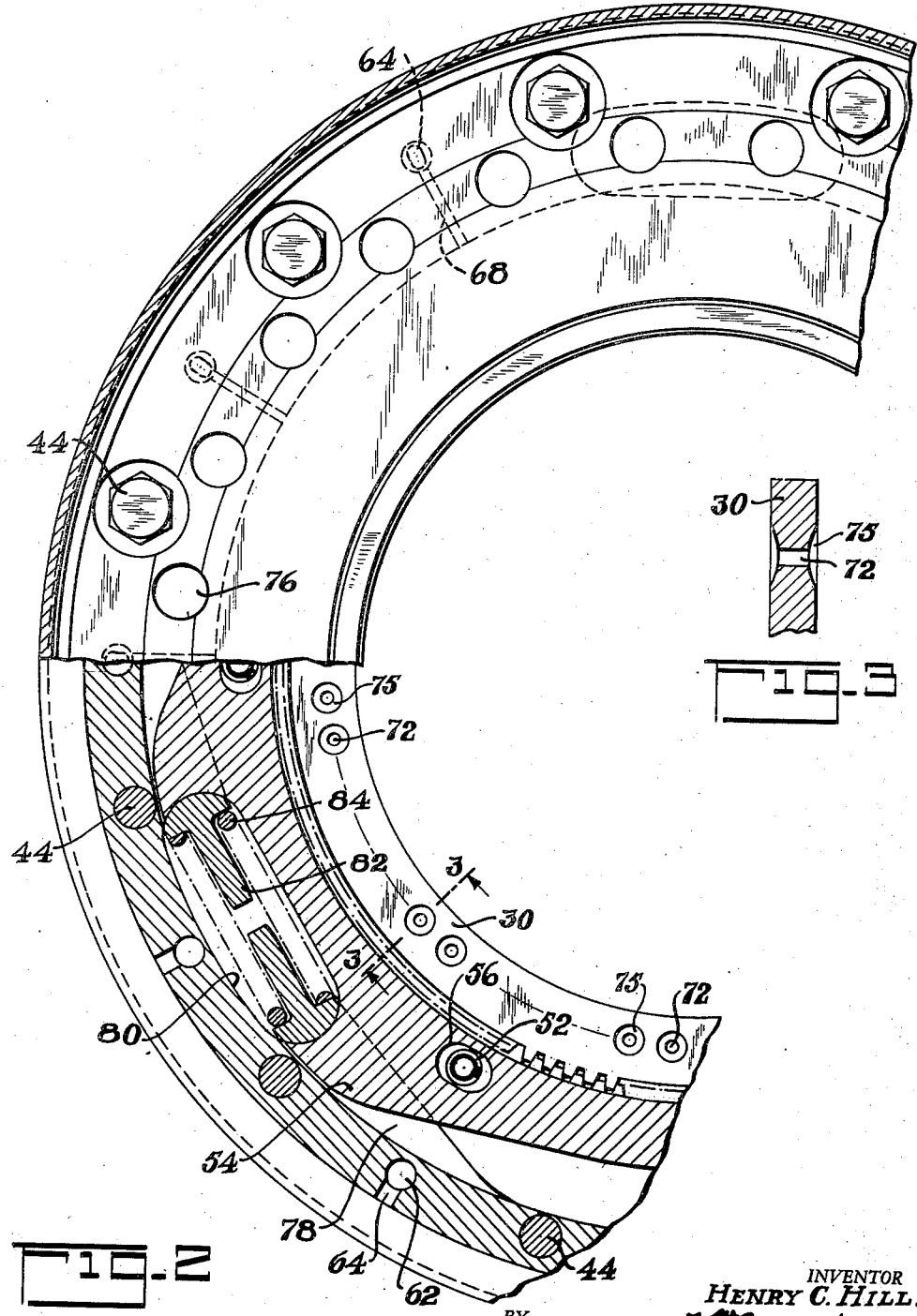

2,407,699

UNITED STATES PATENT OFFICE 2,407,699

HYDRAULIC BRAKE

Henry C. Hill, Montclair, N. J., assignor to Wright Aeronautical Corporation, a corporation of New York Application September 20, 1943, Serial No. 503,144

11 Claims. (Cl. 188—152)

This invention relates to a hydraulic clutch or brake and is particularly directed to a fluid operated plate clutch or brake in which the engaging surfaces are lubricated by the actuating fluid. The invention is illustrated and described in connection with and as forming a part of the variable speed transmission and associated brake disclosed in the copending application of Hill et al., Serial No. 461,026, filed October 6, 1942, now Patent No. 2,368,835, Feb. 6, 1945. However, as will appear from the following description, the invention is not limited to this specific use, but is of general application and may be used either with a frictionally engaging clutch or brake.

The aforementioned copending application of Hill et al. discloses a brake which, when engaged, locks up a cage carrying a plurality of double planet pinions to provide a gear drive through the pinions and which, when disengaged, permits rotation of the pinion carrier. The design of the transmission is such that upon rotation of the pinion carrier, the centrifugal force acting on the pinions is of sufficient magnitude to lock the pinions about their journals, thereby providing a direct drive connection. In order to effect a return to the gear drive through the pinions, the brake is again engaged to prevent rotation of the pinion carrier. In practice it has been found that the frictional forces locking the pinions about their journals are of such magnitude that the brake must exert excessive friction torque to break the pinions loose from their journals in order to secure the pinion carrier against rotation. This excessive friction torque has caused considerable scuffing of the brake plates and it is an object of this invention to provide means to lubricate the friction engaging surfaces of the brake in order to eliminate or minimize this scuffing.

It is a further object of the invention to provide a fluid actuable brake in which the friction surfaces are lubricated by the actuating fluid. A still further object of the invention is to provide a lubricated brake or clutch in which there is a continual flow of lubricant over the friction surfaces while slippage occurs and in which the flow of lubricant automatically ceases when the friction surfaces become clamped together. Another object of the invention is to provide a self-sealing lubricated clutch or brake in which the clutch or brake is constructed to insure uniform lubrication over the entire friction engaging surface.

Other objects of the invention will become apparent upon reading the annexed detailed description in connection with the drawings in which:

Fig. 1 is an axial section through the invention,
Fig. 2 is a view along line 2—2 of Fig. 1, and
Fig. 3 is an enlarged sectional view taken along line 3—3 of Fig. 2.

Referring to the drawings, an engine-driven shaft 10 is drivably connected to a gear 12 by means not shown and a driven shaft 14 journaled about the drive shaft is adapted to be driven by the gear 16. An annular cage 18 is concentrically disposed about the shafts 10 and 14 and is provided with a plurality of double planet pinions 20 journaled about shafts 22 carried by the cage. Each of the double pinions 20 is meshed with one of the gears 12 and 16 whereby, when the cage or pinion carrier 18 is held stationary, the double pinions provide a step-up drive between the gears 12 and 16.

In order to hold the pinion carrier stationary a multi-plate brake 24 is provided about the external periphery of the pinion carrier. As more fully described in the aforementioned copending application, when the pinion carrier is released the design is such that the rotation of the pinion carrier with its pinions subjects the pinions to a centrifugal force sufficient to lock these pinions against rotation about their journals 22. Therefore, upon release of the brake 24 a direct drive is provided between the gears 12 and 16. In order to return to the step-up drive ratio the brake 24 is engaged to stop rotation of the pinion carrier. This requires a braking torque sufficient to overcome the friction locking torque of the pinions about their journals. In practice it has been found that the pinions lock up so tightly that the torque required of the brake 24 in its slipping condition in order to break the pinions loose is of such magnitude as to cause considerable scuffing of the friction engaging surfaces of the brake. This scuffing has been eliminated by lubricating the brake surfaces in the manner hereinafter described. The construction is such that upon initial engagement of the braking surfaces there is a considerable flow of lubricant between the surfaces and as the slippage gradually decreases the lubricating flow also decreases until, when the brake is positively engaged, the flow of lubricant automatically ceases.

The brake 24 comprises a series of annular plates 26 which are splined at 28 to the outer periphery of the cage or pinion carrier 18 and an interposed series of annular plates 30 are splined at 32 to an annular drum 34. The annular drum 34 is resiliently supported from a housing structure 36 by an interposed supporting structure 38. A pair of opposed annular members 40 and 42 are secured to each side of the supporting structure 38 by bolts 44 to provide an annular cylindrical space surrounding the series of brake plates 26 and 30. A pair of annular pistons 46 and 48 are sealingly disposed at the ends of said annular cylinder for effecting engagement of the brake plates 26 and 30.

The pistons 46 and 48 are provided with a plurality of facing bosses 50 and a plurality of springs 52 are disposed between the pistons about these bosses to urge each piston away from the brake plates and toward their respective ends of the cylinder. The annular drum 34 is provided with an outwardly extending flange or tongue 54 having a plurality of openings 56 through which the springs 52 extend.

Oil pressure is supplied to the control valve 57 preferably from the engine oil pressure system. A conduit 58 interconnects this valve with an annular groove 60 formed about the periphery of the supporting structure 38. From the annular groove 60 oil pressure is fed to a plurality of transverse bores 62 through the substantially radial passages 64. The ends of the transverse passages 62 respectively communicate with substantially radial passages 66 and 68 in the annular cylinder forming members 42 and 46. At their inner ends the passages 66 and 68 communicate with the annular cylindrical space behind the pistons 46 and 48 respectively. Therefore, when the valve 57 is in its open position as illustrated, fluid pressure is supplied to the annular groove 60, transverse passages 62, radial passages 66 and 68, to the annular space behind the pistons 46 and 48. This fluid pressure urges the pistons 46 and 48 toward each other to clamp the brake plates together thereby locking the cage or pinion carrier against rotation relative to the housing 36. The brake 24 may be released by moving the valve 57 to its dotted line position as illustrated in the drawing. In this latter position the conduit 58 is connected to a vent 69 whereby the springs 52 are operative to release the brake.

In order to lubricate the brake plates each piston is provided with a plurality of circumferentially disposed restrictive openings 70 and each of the brake plates 26 and 30 are provided with a corresponding number of similarly located openings 72 and 74 respectively. Each of the openings 72 and 74 are provided with so-called "Michelled" edges 75 to help or otherwise aid the radial flow of lubricant from the openings 72 and 74 over the surfaces of the plates 26 and 30. That is, the edges of the holes 72 and 74 in effect are provided with a flat bevel. The openings or holes 70 in the piston are restricted in size relative to the oil inlet passages 66 and 68 whereby, when the valve 56 is opened the oil pressure will immediately build up behind the pistons to actuate the pistons toward engagement of the brake plates. Because of the relative slip of the brake plates the holes 70, 72, and 74 will line up quite frequently so that there will be oil flow through these holes and out over the plates from the holes 72 and 74 to lubricate the plates. After the brake plates are locked together no lubrication is necessary so that it is immaterial whether the holes are then alined. If desired annular grooves may be provided on each surface of the plates 26 and 30 across the holes 72 and 74 to insure a continuous flow of lubricating oil through and across the plates 26 and 30 prior to clamping engagement of these plates. In either construction the oil flows through the holes 72 and 74 in the various brake plates and escapes radially over the adjacent surfaces of these plates to effectively lubricate and cool these surfaces. This flow of oil over the adjacent surfaces of the plates escapes axially over the inner and outer diameters of these plates and thence through appropriate passages to the engine sump.

As the pressure builds up behind the pistons the plates 26 and 30 are squeezed closer and closer together. The friction torque developed by the brake gradually increases and the escaping flow of oil between the plates is gradually restricted until the plates develop sufficient torque to unlock the pinions 20 from their journals 22. When this point is reached the plates 26 and 30 are locked or clamped together and this clamping engagement of the plates shuts off the flow of lubricating oil out between the plates. Passages 76 formed in the annular members 40 and 42 permit return of oil escaping radially outward from the plates 26 and 30.

The above described construction provides a lubricating oil flow over the entire friction engaging surface of the brake plates, which oil flow will carry away the frictional heat developed by the relative slippage of the brake plates. The oil pressure operating the brake is preferably derived from the engine oil pressure system as was also the case in the aforementioned copending application of Hill et al. However, when the brake plates are lubricated their coefficient of friction is considerably reduced and therefore much higher fluid pressures are necessary to effect locking engagement of the brake. Therefore, a booster pump may be necessary in order to augment the pressure supplied by the engine oil pressure system.

The brake 24 has been described in connection with a particular transmission; however, it seems obvious that this brake is of general application and may be used wherever a friction clamping torque is desired. The flow of lubricating oil over the friction engaging surfaces lubricates these surfaces and, in addition, carries away the heat developed during slippage of these surfaces. It is also a feature of this invention that the locking engagement of the friction engaging surfaces automatically operates to seal or shut off this flow of oil when it is no longer needed. In addition, the provision of a piston at both ends of the series of brake plates 26 and 30 provides for a uniform torque distribution between the various plates and the provision of means to feed lubricating oil through the series of plates from both ends of the series insures uniform lubrication of all the plates.

The outer brake drum 34 preferably is resiliently connected to the supporting structure 38 in order to provide a radially and a torsionally yieldable support. The supporting structure 38 is provided with radially disposed parallel flanges 78 between which the flange portion 54 of the drum 34 is adapted to be interfitted. The inner diameters of the flanges 78 alternately increase and decrease in magnitude and the outer diameter of the flange portion 54 is similarly constructed, whereby these members may be axially assembled and then rotated to their interfitted position. The overlapping portions of the flanges 54 and 78 are each provided with similar cutout portions 80. Each of these cutout portions is adapted to receive a pair of opposed bearing members 82 having a spring 84 interposed therebetween. With this construction the spring 84 permits slight relative rotative and radial movement between the supporting structure 38 and the drum 34. The purpose of this resilient connection is to prevent uneven loading of one or more of the pinions 28. It should be noted that the previously described brake can be used with or without this resilient supporting structure.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, relatively rotatable members having frictionally engageable surfaces, a piston-cylinder assembly for effecting clamping engagement of said surfaces upon the application of oil pressure thereto, and oil passage means from said assembly communicating with the space between said surfaces to provide for flow of said oil over said surfaces upon the application of oil pressure to said assembly such that clamping engagement of said surfaces is operative to shut off said flow of oil.

2. In combination, a pair of annular relatively rotatable friction discs, a piston-cylinder assembly for effecting clamping engagement of said discs upon the application of oil pressure to said assembly, one or more restricted oil passages extending from said assembly to the adjacent friction disc intermediate the inner and outer diameters of said disc, and cooperating oil passages extending through said adjacent disc whereby, upon application of oil pressure to said piston-cylinder assembly, oil flows through said passages and out between the engageable surfaces of said discs, the clamping engagement of said surfaces being operative to shut off said flow of oil.

3. In combination with a pair of relatively rotatable members, means to frictionally inhibit relative rotation of said members comprising a multiple disc-type clutch having a plurality of annular friction discs disposed in side-by-side relation and each connected to one or the other of said members such that adjacent discs are connected to different members, piston means engageable with said plurality of discs, means to apply oil pressure to said piston means for effecting clamping engagement of said discs, each of said annular discs having one or more oil passages extending therethrough intermediate their inner and outer diameters, and means for supplying oil into said passages at each end of said plurality of discs simultaneously with the application of oil to said piston means.

4. In combination with a pair of relatively rotatable members, means to frictionally inhibit relative rotation of said members comprising a multiple disc-type clutch having a plurality of annular friction discs disposed in side-by-side relation and each connected to one or the other of said members such that adjacent discs are connected to different members, piston means engageable with said plurality of discs, means to apply oil pressure to said piston means for effecting clamping engagement of said discs, each of said annular discs having one or more oil passages extending therethrough intermediate their inner and outer diameters, the ends of each of said passages being beveled at the faces of each of said discs, and means for supplying oil into said passages at each end of said plurality of discs simultaneously with the application of oil to said piston means.

5. In combination with a pair of relatively rotatable members, means to frictionally inhibit relative rotation of said members comprising a multiple disc-type clutch having a plurality of annular friction discs disposed in side-by-side relation and each connected to one or the other of said members such that adjacent discs are connected to different members, piston means engageable with each end of said plurality of discs, and means to apply oil pressure simultaneously to each piston for effecting clamping engagement of said discs, each of said piston means having one or more restricted oil passages therethrough to the adjacent disc intermediate the inner and outer diameters of said discs and each of said discs having one or more cooperating oil passages extending therethrough intermediate their inner and outer diameters.

6. In combination with a pair of relatively rotatable members, means to frictionally inhibit relative rotation of said members comprising a multiple disc-type clutch having a plurality of annular friction discs disposed in side-by-side relation and each connected to one or the other of said members such that adjacent discs are connected to different members, piston means, means to apply oil pressure to said piston means for effecting clamping engagement of said discs, and oil passage means extending through said piston and through said plurality of discs intermediate the inner and outer diameters of said discs, whereby, upon application of said oil pressure, oil flows from said passage means over the engageable surfaces of said discs prior to their complete clamping engagement and upon complete engagement of said discs said oil flow is automatically interrupted thereby.

7. In combination with a pair of relatively rotatable members, means to frictionally inhibit relative rotation of said members comprising a multiple disc-type clutch having a plurality of annular friction discs disposed in side-by-side relation and each connected to one or the other of said members such that adjacent discs are connected to different members, piston means, means to apply oil pressure to said piston means for effecting clamping engagement of said discs, and oil passage means spaced from the periphery of said piston means and discs and extending therethrough whereby, upon application of said oil pressure, oil flows from said passage means over the engageable surfaces of said discs prior to their complete clamping engagement and upon complete engagement of said discs said oil flow is automatically interrupted thereby.

8. In combination with a pair of relatively rotatable members, means to frictionally inhibit relative rotation of said members comprising a multiple disc-type clutch having a plurality of annular friction discs disposed in side-by-side relation and each connected to one or the other of said members such that adjacent discs are connected to different members, piston means engageable with each end of said plurality of discs, means to apply oil pressure simultaneously to each piston for effecting clamping engagement of said discs, and oil passage means spaced from the periphery of said piston means and discs and extending therethrough, whereby, upon application of said oil pressure, oil flows from said passage means over the engageable surfaces of said discs prior to complete clamping engagement of said discs and upon complete engagement of said discs said oil flow is automatically interrupted thereby.

9. In combination, a pair of relatively-rotatable members having frictionally-engageable surfaces, a source of liquid under pressure, means operative upon the application of said liquid pressure thereto for effecting clamping engagement of said surfaces, liquid passage means from said source to said first-mentioned means and to one or more points on said surfaces and spaced from the edges of said surfaces, and valve means operable to control said passage means to effect application of said liquid pressure from said source to said first-mentioned means and to simultaneously supply liquid from said source to said one or more points on said surfaces.

10. In combination, a pair of relatively rotatable members having frictionally engageable surfaces, means operative upon the application of liquid pressure thereto for effecting clamping frictional engagement of said surfaces, passage means arranged to place a source of liquid under pressure in communication with said first-mentioned means and with said surfaces, and means operable to control said passage means such that liquid under pressure from said source is transmitted to said first-mentioned means and substantially simultaneously is transmitted to said surfaces for flow thereover.

11. In combination, a pair of relatively rotatable members having frictionally engageable surfaces, means operative upon the application of liquid pressure thereto for effecting clamping frictional engagement of said surfaces, passage means arranged to place a source of liquid under pressure in communication with said first-mentioned means and with said surfaces, and means operable to control said passage means such that liquid under pressure from said source is transmitted to said first-mentioned means and substantially simultaneously is transmitted to said surfaces for flow therebetween such that clamping engagement of said surfaces shuts off said flow.

HENRY C. HILL.